(12) United States Patent
Fenny et al.

(10) Patent No.: US 11,655,022 B2
(45) Date of Patent: *May 23, 2023

(54) ANTI-TORQUE CONTROL USING FIXED BLADE PITCH MOTORS

(71) Applicant: TEXTRON INNOVATIONS INC., Providence, RI (US)

(72) Inventors: Carlos Fenny, Fort Worth, TX (US); Thomas Dewey Parsons, Fort Worth, TX (US); Erik John Oltheten, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,724

(22) Filed: Oct. 27, 2021

(65) Prior Publication Data
US 2022/0073197 A1 Mar. 10, 2022

Related U.S. Application Data

(60) Continuation of application No. 16/886,000, filed on May 28, 2020, now Pat. No. 11,174,018, which is a division of application No. 15/458,525, filed on Mar. 14, 2017, now Pat. No. 10,703,471, which is a continuation-in-part of application No. 15/172,811, filed on Jun. 3, 2016, now Pat. No. 10,377,479.

(51) Int. Cl.
*B64C 27/82* (2006.01)
*B64C 27/04* (2006.01)
*G05D 1/08* (2006.01)

(52) U.S. Cl.
CPC .............. *B64C 27/82* (2013.01); *B64C 27/04* (2013.01); *G05D 1/0858* (2013.01); *B64C 2027/8209* (2013.01); *B64C 2027/8227* (2013.01); *B64C 2027/8254* (2013.01); *B64C 2220/00* (2013.01)

(58) Field of Classification Search
CPC .................... B64C 2027/82; B64C 2027/8254
See application file for complete search history.

(56) References Cited

U.S. PATENT DOCUMENTS

| 2,378,617 A | 6/1945 | Burke |
| 2,491,549 A | 12/1949 | Brewster |

(Continued)

FOREIGN PATENT DOCUMENTS

| CN | 1126157 A | 7/1996 |
| CN | 201932359 | 7/1996 |

(Continued)

OTHER PUBLICATIONS

Canadian Intellectual Property Office, Examination Report for CA Appl. No. 2,969,660 dated Sep. 14, 2018, 4 pp.

(Continued)

*Primary Examiner* — Richard G Davis
(74) *Attorney, Agent, or Firm* — Edwin S. Flores; Daniel J. Chalker; Chalker Flores, LLP

(57) ABSTRACT

The present invention includes an a plurality of first variable speed motors mounted on a tail boom of the helicopter; one or more fixed pitch blades attached to each of the plurality of first variable speed motors; and wherein a speed of one or more of the plurality of first variable speed motors is varied to provide an anti-torque thrust.

20 Claims, 12 Drawing Sheets

(56) References Cited

U.S. PATENT DOCUMENTS

| | | | |
|---|---|---|---|
| 4,953,811 A | 9/1990 | Smith | |
| 8,464,980 B2 | 6/2013 | Certain | |
| 8,757,542 B2 | 6/2014 | Hopdjanian et al. | |
| 8,807,476 B2 | 8/2014 | Raffel et al. | |
| 8,870,114 B2 | 10/2014 | Botti et al. | |
| 8,931,732 B2 | 1/2015 | Sirohi et al. | |
| 8,944,367 B2 | 2/2015 | Bystry, Jr. et al. | |
| 8,979,015 B2 | 3/2015 | Gaillard | |
| 9,004,395 B2 * | 4/2015 | Botti .................. | B64C 27/82 244/17.11 |
| 9,067,676 B1 | 6/2015 | Hethcock et al. | |
| 9,085,355 B2 | 7/2015 | DeLorean | |
| 9,169,027 B2 | 10/2015 | Strauss et al. | |
| 9,174,728 B2 | 11/2015 | Altmikus et al. | |
| 9,181,811 B2 | 11/2015 | Germanetti | |
| 9,194,285 B2 | 11/2015 | Botti et al. | |
| 9,242,728 B2 | 1/2016 | Morrison | |
| 9,248,908 B1 | 2/2016 | Luyks | |
| 9,415,870 B1 | 8/2016 | Beckman et al. | |
| 9,446,842 B2 | 9/2016 | Luyks | |
| 9,592,899 B2 | 3/2017 | Fink | |
| 9,631,516 B2 | 4/2017 | Hamann et al. | |
| 9,758,245 B2 | 9/2017 | Ries | |
| 9,764,822 B2 | 9/2017 | Morrison | |
| 10,377,479 B2 | 8/2019 | Parsons et al. | |
| 10,703,471 B2 | 7/2020 | Fenny et al. | |
| 2004/0217229 A1 | 11/2004 | Arlton | |
| 2010/0123039 A1 | 5/2010 | Buhl et al. | |
| 2010/0127114 A1 | 5/2010 | Nakayama et al. | |
| 2011/0121128 A1 | 5/2011 | Balkus, Jr. | |
| 2012/0012693 A1 | 1/2012 | Thomassey | |
| 2012/0160954 A1 | 6/2012 | Thomassey | |
| 2013/0092789 A1 | 4/2013 | Botti et al. | |
| 2013/0134256 A1 | 5/2013 | Gaillard | |
| 2013/0147204 A1 | 6/2013 | Botti et al. | |
| 2013/0170985 A1 | 7/2013 | Altmikus et al. | |
| 2013/0264412 A1 * | 10/2013 | Dyrla .................. | B64C 27/82 244/17.13 |
| 2014/0158816 A1 | 6/2014 | DeLorean | |
| 2014/0290208 A1 | 10/2014 | Rechain et al. | |
| 2014/0374534 A1 * | 12/2014 | McCollough ........ | B64C 27/82 244/17.21 |
| 2014/0374535 A1 | 12/2014 | Wong et al. | |
| 2015/0225078 A1 * | 8/2015 | Ries .................... | B64C 27/72 416/3 |
| 2016/0052626 A1 | 2/2016 | Vander Mey | |
| 2016/0083085 A1 | 3/2016 | Strauss et al. | |
| 2016/0272296 A1 | 9/2016 | Fink | |
| 2016/0311528 A1 | 10/2016 | Nemovi et al. | |
| 2017/0066531 A1 | 3/2017 | McAdoo | |
| 2017/0174335 A1 | 6/2017 | Malloy | |
| 2017/0174355 A1 | 6/2017 | Malloy | |
| 2017/0253326 A1 | 9/2017 | Mullins | |
| 2017/0253328 A1 | 9/2017 | Wang | |
| 2017/0349273 A1 | 12/2017 | Parsons et al. | |
| 2017/0349274 A1 | 12/2017 | Fenny et al. | |
| 2017/0349276 A1 | 12/2017 | Fenny | |
| 2019/0071173 A1 | 3/2019 | Parsons et al. | |

FOREIGN PATENT DOCUMENTS

| | | |
|---|---|---|
| CN | 102971216 A | 3/2013 |
| CN | 103661917 A | 3/2014 |
| CN | 107458597 A | 12/2017 |
| CN | 107458598 A | 12/2017 |
| CN | 107458599 A | 12/2017 |
| DE | 202012001750 U1 | 3/2012 |
| DE | 102011054849 B3 | 1/2013 |
| EP | 1976755 A1 | 10/2008 |
| EP | 2155552 A1 | 2/2010 |
| EP | 2186727 A2 | 5/2010 |
| EP | 2327625 A1 | 6/2011 |
| EP | 2394914 A1 | 12/2011 |
| EP | 2404775 A2 | 1/2012 |
| EP | 2412630 A1 | 2/2012 |
| EP | 2571761 A1 | 3/2013 |
| EP | 2571763 A2 | 3/2013 |
| EP | 2571764 A1 | 3/2013 |
| EP | 2610176 A1 | 7/2013 |
| EP | 2631174 A1 | 8/2013 |
| EP | 2636601 A1 | 9/2013 |
| EP | 2739530 A1 | 6/2014 |
| EP | 2821344 A1 | 1/2015 |
| EP | 2933187 A1 | 10/2015 |
| EP | 2982604 A1 | 2/2016 |
| EP | 3116781 A1 | 1/2017 |
| EP | 3137376 A1 | 3/2017 |
| EP | 3216696 A1 | 9/2017 |
| EP | 3251952 A1 | 12/2017 |
| EP | 3254962 A1 | 12/2017 |
| EP | 3254963 A1 | 12/2017 |
| FR | 2951137 A1 | 4/2011 |
| JP | 2003175897 A | 6/2003 |
| JP | 2009090755 A | 4/2009 |
| KR | 1020150070951 | 4/2009 |
| WO | 2016128330 A1 | 8/2016 |
| WO | 2016164280 A1 | 10/2016 |

OTHER PUBLICATIONS

China National Intellectual Property Administration, Examination Report dated Jul. 29, 2019 for Chinese Appl. No. 201710408558.7, 15 pp.

China National Intellectual Property Administration, Examination Report dated Aug. 12, 2019 for Chinese Appl. No. 201710409135.7, 14 pp.

China National Intellectual Property Administration, Examination Report dated Aug. 15, 2019 for Chinese Appl. No. 201710408541.1, 19 pp.

European Patent Office, Communication Pursuant to Article 94(3) EPC for EP Appl. No. 17174337.0 dated Dec. 1, 2017, 4 pp.

European Patent Office, Communication Pursuant to Article 94(3) EPC for EP Appl. No. 1717294.3 dated Dec. 1, 2017, 5 pp.

European Patent Office, Communication Pursuant to Article 94(3) EPC for EP Appl. No. 17174263.8 dated Nov. 10, 2017, 8 pp.

European Patent Office, Extended European Search Report for EP Application Serial No. 17174263 8, dated Oct. 17, 2017, 4 pp.

European Patent Office, Extended European Search Report for EP Application Serial No. 17174337.0, dated Nov. 15, 2017, 5 pp.

European Patent Office, Extended European Search Report for EP Application Serial No. 17174294.3, dated Nov. 14, 2017, 4 pp.

European Patent Office, Extended European Search Report for EP Application Serial No. 18211495.9, dated Feb. 27, 2019, 4 pp.

European Patent Office, Communication pursuant to Article 94(3) EPC for EP Application Serial No. 18211495.9, dated Mar. 14, 2019, 4 pp.

Intellectual Property India, First Examination Report for India Patent Appl. No. 201724019356 dated Jun. 13, 2019, 5 pp.

Intellectual Property India, First Examination Report for India Patent Appl. No. 201724019354 dated Jul. 18, 2019, 7 pp.

Intellectual Property India, First Examination Report for India Patent Appl. No. 201724019355 dated Jul. 18, 2019, 6 pp.

* cited by examiner

US 11,655,022 B2

ANTI-TORQUE CONTROL USING FIXED BLADE PITCH MOTORS

CROSS-REFERENCE TO RELATED APPLICATIONS

This application claims priority to and is a continuation patent application of U.S. patent application Ser. No. 16/886,000, filed on May 28, 2020, which is a divisional patent application of U.S. patent application Ser. No. 15/458,525, filed on Mar. 14, 2017, now U.S. Pat. No. 10,703,471, which is a continuation-in-part patent application of U.S. patent application Ser. No. 15/172,811, filed on Jun. 3, 2016, now U.S. Pat. No. 10,377,479, which are hereby incorporated by reference in their entirety.

TECHNICAL FIELD OF THE INVENTION

This invention is generally in the field of flight control, and relates specifically to an anti-torque system and control for helicopters.

STATEMENT OF FEDERALLY FUNDED RESEARCH

Not applicable.

BACKGROUND OF THE INVENTION

Without limiting the scope of the invention, its background is described in connection with anti-torque systems.

Counter-torque tail rotors are often used in helicopters and are generally mounted adjacent to vertical fins that provide for aircraft stability. In such a configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise. To address these issues, the vertical fin can be replaced by an annular airfoil (sometimes called a ring wing) having an inner diameter greater than the diameter of the tail rotor and which can be mounted around the tail rotor.

SUMMARY OF THE INVENTION

In one embodiment, the present invention includes an anti-torque module for a helicopter comprising: a plurality of first variable speed motors arranged in a first matrix pattern and mounted on a tail boom of the helicopter; one or more fixed pitch blades attached to each of the plurality of first variable speed motors; and wherein a speed of one or more of the plurality of first variable speed motors is varied to provide an anti-torque thrust. In one aspect, one or more of the plurality of first variable speed motors can operate to provide a directional thrust: starboard, port, or both starboard and port concurrently. In another aspect, one or more of the plurality of first variable speed motors are at least one of electric or hydraulic motors. In another aspect, the electric motor is at least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor. In another aspect, the hydraulic motor is at least one of: a gear and vane motor, a gerotor motor, an axial plunger motor, a constant pressure motor, a variable pressure motor, a variable flow motor, or a radial piston motor. In another aspect, the plurality of first variable speed motors comprises 3, 4, 5, 6, 7, 8, 9, 10, 11, 12, 13, 14, 15, or more motors that can be at least one of: turned on or off independently, turned on or off as a group, turned one or off in pairs, or each motor can operate independently to direct thrust in a same or a different direction. In another aspect, the module further comprises a ring or cowling surrounding one or more of the plurality of first variable speed motors and the respective fixed pitch blades, wherein the ring or cowling is attached to a separate pivot, or the ring or cowling surrounds all of the plurality of first variable speed motors and the respective fixed pitch blades. In another aspect, the first matrix pattern is planar with the tail boom. In another aspect, the first matrix pattern rotates about a longitudinal axis of the tail boom. In another aspect, the anti-torque module is round, oval, crescent-shaped, J-shaped, diagonal, square, rectangular, triangular, pentagonal, hexagonal, polygonal, rhomboid, trapezoid, X-shaped, Y-shaped, or kite shaped. In another aspect, the module further comprises a plurality of second variable speed motors in a second matrix pattern, with respective fixed pitch blades, that is substantially parallel and planar with the first matrix pattern. In another aspect, the plurality of variable speed motors in the first and second matrix patterns are coaxially aligned with one another and the fixed pitch blades are outwardly facing. In another aspect, two or more of the plurality of first variable speed motors and fixed pitch blades are selected or operated to have a different noise frequency, and the frequencies or speeds are selected to cancel or reduce a noise of the tail rotor during operation. In another aspect, the two or more of the plurality of first variable speed motors are a different size. In another aspect, the two or more of the plurality of fixed pitch blades are a different size. In another aspect, the plurality of fixed pitch blades and first variable speed motors are individually ducted. In another aspect, each of the plurality of fixed pitch blades and first variable speed motors are on a pivot that allows for rotation of the individual fixed pitch blades and first variable speed motors. In another aspect, the module further comprises a control logic in a flight control computer for at least one of: calculates the overall torque generated by the plurality of motors; reduces or eliminates torque; maximize thrust; reduces or eliminates transients; reduces overall tail rotor noise; manages the wear on individual motors; monitors a vortex ring state at the tail rotor; pulses the motors to reduce or eliminate vortex ring states; controls at least one of a position or the speed of one or motors mounted on individual pivots; or controls at least one of a position or the speed of one or motors if the anti-torque module rotates around a longitudinal axis of the tail boom. In another aspect, the module further comprises a rotational sensing system that measures a rotation of the helicopter, and a control logic that comprises a rotation modeling unit that receives rotational data reflective of a rotation of the helicopter to determine changes to the speed of the first variable speed motors to control or modify the rotation of the helicopter. In another aspect, the control logic further comprises a filtering unit interposed between the rotational sensing system and the first variable speed motors, wherein the filtering unit is configured to remove noise from the data prior to the data being received by the logic, and the logic changes the speed of the one or more first variable speed motors after removing the noise. In another aspect, the control logic further comprises a correction logic configured to iteratively correct inaccuracy between an estimated and an actual rotation of the helicopter at a known speed of the one or more first variable speed motors. In another aspect, the control logic further comprises a correction logic configured to correct inaccuracy in the rotation of the helicopter by reference to speed data for the one or more first fixed blade pitch variable speed motors versus rotation of the helicopter.

In one embodiment, the present invention includes an anti-torque system for a helicopter comprising: a plurality of first variable speed motors arranged in a first matrix pattern mounted on a tail boom of the helicopter; one or more fixed pitch blades attached to each of the plurality of first variable speed motors, wherein a speed and direction of the plurality of first variable speed motors and their respective fixed pitch blades is varied to provide directional thrust; and a logic in a flight control computer for controlling at least one of: the speed, the direction, or both the speed and direction, of the one or more of the plurality of first variable speed motors to reduce or eliminate torque from a main rotor. In one aspect, one or more of the plurality of first variable speed motors can operate to provide a directional thrust: starboard, port, or both starboard and port concurrently. In another aspect, one or more of the plurality of first variable speed motors are at least one of electric or hydraulic motors. In another aspect, the logic controls at least one of: calculates the overall torque generated by the plurality of motors; reduces or eliminates torque; maximize thrust; reduces or eliminates transients; reduces overall tail rotor noise; manages the wear on individual motors; monitors a vortex ring state at the tail rotor; pulses the motors to reduce or eliminate vortex ring states; controls at least one of a position or the speed of one or motors mounted on individual pivots; or controls at least one of a position or the speed of one or motors if the anti-torque matrix rotates around a longitudinal axis of the tail boom. In another aspect, the first matrix pattern is substantially planar with the tail boom. In another aspect, the plurality of first variable speed motors comprises 3, 4, 5, 6, 7, 8, 9, 10, 11, 12, 13, 14, 15, or more motors that can be at least one of: turned on or off independently, turned on or off as a group, turned one or off in pairs, or each motor can operate independently to direct thrust in a same or a different direction. In another aspect, the system further comprises a ring or cowling surrounding one or more of the plurality of first variable speed motors and the respective fixed pitch blades, wherein the ring or cowling is attached to a separate pivot, or the ring or cowling surrounds all of the plurality of first variable speed motors and the respective fixed pitch blades. In another aspect, the anti-torque module is round, oval, crescent-shaped, J-shaped, diagonal, square, rectangular, triangular, pentagonal, hexagonal, polygonal, rhomboid, trapezoid, X-shaped, Y-shaped, or kite shaped. In another aspect, the system further comprises a plurality of second variable speed motors in a second matrix pattern, with respective fixed pitch blades, that is substantially parallel and planar with the first matrix pattern. In another aspect, the plurality of variable speed motors in the first and second matrix patterns are coaxially aligned with one another and the fixed pitch blades are outwardly facing. In another aspect, two or more of the plurality of first variable speed motors and fixed pitch blades are selected or operated to have a different noise frequency, and the frequencies or speeds are selected to cancel or reduce a noise of the tail rotor during operation. In another aspect, two or more of the plurality of first variable motors are a different size. In another aspect, two or more of the plurality of fixed pitch blades are a different size. In another aspect, one or more of the plurality of fixed pitch blades and first variable motors are individually ducted. In another aspect, each of the plurality of fixed pitch blades and first variable motors are on a pivot that allows for rotation of the individual fixed pitch blades and first variable motors.

In another embodiment, the present invention also includes a method of operating a helicopter, the method comprising: providing an anti-torque matrix comprising a plurality of first fixed blade pitch variable-speed motors on a tail boom of the helicopter; and operating one or more of the first fixed blade pitch variable-speed motors at one or more speeds to provide at least one of anti-torque thrust or torque thrust, during helicopter operations. In one aspect, the method further comprises calculating or measuring a noise level from each of the plurality of first fixed blade pitch variable-speed motors or from the anti-torque matrix, and adjusting the speed of each of the one or more first fixed blade pitch variable-speed motors to reduce or eliminate noise during operations. In another aspect, the first fixed blade pitch variable-speed motors are at least one of electric or hydraulic. In another aspect, the method further comprises varying a speed of each of the individual first fixed blade pitch variable-speed motor in the plurality of first fixed blade pitch variable-speed motors of the anti-torque matrix in a flight mode to adjust at least one of: a torque, a roll, or a yaw of the helicopter. In another aspect, the method further comprises varying a speed of the one or more first fixed blade pitch variable-speed motors by varying the output from each of the individual fixed blade pitch variable-speed motors for optimum thrust during helicopter operations. In another aspect, the method further comprises pulsing the speed of the one or more first fixed blade pitch variable-speed motors to reduce or eliminate at least one of: a vortex ring state or transients. In another aspect, the method further comprises positioning a plurality of second variable speed motors in a second matrix pattern, with respective fixed pitch blades, that is substantially parallel and planar with the first matrix pattern. In another aspect, the plurality of variable speed motors in the first and second matrix patterns are coaxially aligned with one another and the fixed pitch blades are outwardly facing. In another aspect, the method further comprises operating pairs of the plurality of first fixed blade pitch variable-speed motors, wherein one fixed blade pitch variable-speed motor operates to provide anti-torque thrust and a second fixed blade pitch variable-speed motor increases or decreases speed or direction to provide fine control of the overall directional thrust of the pair of fixed blade pitch variable-speed motors. In another aspect, the method further comprises at least one of: calculating an overall torque generated by the plurality of motors; reducing or eliminating torque; maximizing a directional thrust; reducing or eliminating one or more transients; reducing overall tail rotor noise; managing the wear on individual first fixed blade pitch variable-speed motors; monitoring a vortex ring state at the tail rotor; pulsing one or more of the first fixed blade pitch variable-speed motors to reduce or eliminate vortex ring states; controlling at least one of a position or the speed of one or more first fixed blade pitch variable-speed motors mounted on individual pivots; or controlling at least one of a position or the speed of one or more fixed blade pitch variable-speed motors if the anti-torque matrix rotates around a longitudinal axis of the tail boom. In another aspect, the method further comprises calculating, for an equivalent motor speed, the amount of thrust generated by a fixed blade pitch variable-speed motor that is aft from another fixed blade pitch variable-speed motor, wherein the aft fixed blade pitch variable-speed motor or motors have a higher torque than a fore fixed blade pitch variable-speed motor in the first matrix. In another aspect, the anti-torque module is round, oval, crescent-shaped, J-shaped, diagonal, square, rectangular, triangular, pentagonal, hexagonal, polygonal, rhomboid, trapezoid, X-shaped, Y-shaped, or kite shaped.

In yet another embodiment, the present invention includes a helicopter rotation estimation method for use with a helicopter including a plurality of first fixed blade pitch variable speed motors arranged in a first matrix pattern mounted on a tail boom of the helicopter, the method comprising: measuring the rotation of the helicopter in response to a baseline speed of the plurality of first variable speed motors arranged in a first matrix pattern mounted on a tail boom of the helicopter; measuring a rotational response of the helicopter to a speed signal from the one or more of the first variable speed motors; and comparing the measured rotation of the helicopter to an estimated rotation of the helicopter to modify the speed of the one or more first variable speed motors to achieve a certain rotation of the helicopter based on a comparison of the estimated and the actual rotation of the helicopter. In one aspect, the method further comprises obtaining the airspeed of the aircraft from an airspeed sensing system disposed at a forward portion of an airframe of the aircraft and reducing or increasing the speed of one or more of the plurality of first fixed blade pitch variable speed motors to control a yaw or a response to transients on the helicopter during flight. In one aspect, the step of comparing further comprises filtering noise from data reflective of the rotation of the helicopter. In another aspect, the step of comparing further comprises iteratively correcting data reflective of the rotation of the helicopter between the estimated rotation and the actual rotation. In another aspect, the step of comparing further comprises correcting data reflective of the rotation of the helicopter by reference to speed data for the one or more first fixed blade pitch variable speed motors versus rotation of the helicopter. In another aspect, a logic that operates the method is found in a flight control computer.

Yet another embodiment of the present invention is a helicopter comprising an anti-torque module for a helicopter comprising: a plurality of first variable speed motors arranged in a first matrix pattern and mounted on a tail boom of the helicopter; one or more fixed pitch blades attached to each of the plurality of first variable speed motors; and wherein a speed of one or more of the plurality of first variable speed motors is varied to provide an anti-torque thrust.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
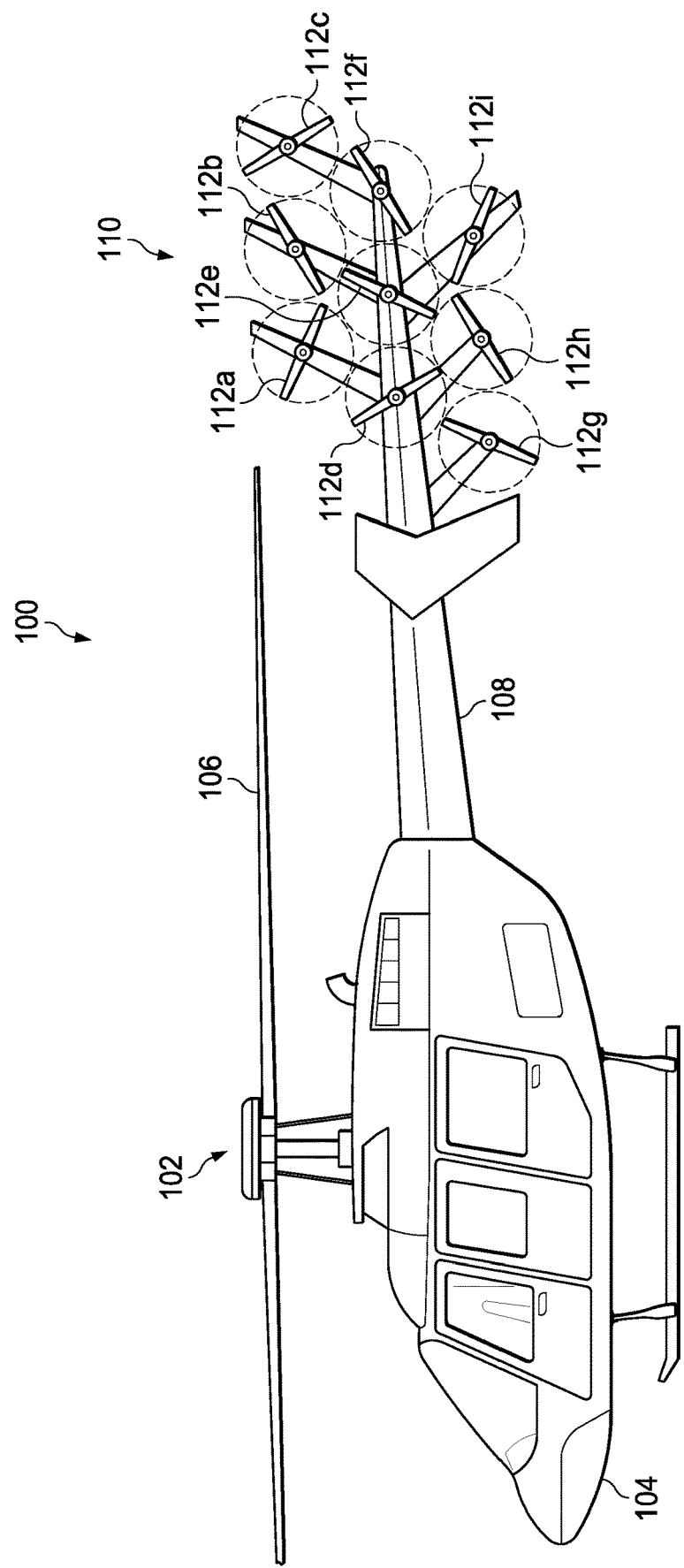
FIG. 1 is a side-view schematic diagram of a helicopter showing an anti-torque matrix shown with fixed blade pitch motors.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Most helicopters with a single, main rotor system require a separate rotor to overcome torque. This is traditionally accomplished on helicopters using a variable pitch, anti-torque rotor or tail rotor receiving power from the engine(s) through shafts and gearboxes. While many attempts have been made to power a traditional single tail rotor directly using a large electric motor to replace traditional shafts and gearboxes. These attempts proved to be impractical however due to the excessive weight of an electric motor capable of providing the required torque and speed to power a traditional tail rotor. Additionally the safety reliability of a single or even a dual electric motor does not approach the safety reliability of shafts and gearboxes.

The present invention is directed to an anti-torque control using a matrix of fixed blade pitch motor modules resolves the excessive weight and safety reliability issues with electrically powered anti-torque by utilizing a matrix of small fixed blade pitch electric motor modules in place of a traditional tail rotor.

The present invention has certain advantages over prior tail-rotor configurations. One such advantage is the low rotational inertia of the individual fixed blade pitch motors (e.g., electrically, hydraulically, or pneumatically driven motors) that together form the anti-torque matrix, wherein the individual motors can be individually controlled to have their speed and direction changed rapidly. The present invention also eliminates the complexity of a variable blade pitch system. An advantage of the present invention includes the use of small size of fixed blade pitch electric motor modules provides adequate convection cooling, eliminating requirement for active cooling system. Further, operating a large number of fixed blade pitch electric motor modules provides safety reliability from component failures through a high level of redundancy without excessive weight. In addition, the wide distribution of fixed blade pitch electric motor modules provides for increased safety from external threats such as collision and lightening. Also, when a helicopter is on the ground with main rotor turning, the lower inertia of the fixed blade pitch electric motor modules and the ability to shut them down completely reduces the injury risk from blade contact to personnel. Moreover, the present invention increases cruise efficiency by slowing down or stopping selected fixed blade pitch electric motor modules. Another important advantage of the present invention is reduced passenger noise and vibration by operating the matrix of fixed blade pitch electric motor modules at slower speeds, or stopping selected fixed blade pitch electric motor modules. The present invention also reduces objectionable ground noise in hover by operating the matrix of fixed blade pitch electric motor modules at different individual speeds to distribute frequencies across a wide band. During operation, the present invention can increase stability during flight by providing a yaw stability augmentation capability through fly-by-wire controls. Finally, the speed of fixed blade pitch electric motor modules can be increased when operating at higher altitudes to compensate for decrease in thrust. The present invention also provides an increase in cruise efficiency through directional optimization of thrust angle of the anti-torque matrix.

The present invention includes a convertible helicopter anti-torque matrix that uses fixed blade pitch electrically or hydraulically-driven motors, variable-speed motors for ground and low speed forward flight. The entire anti-torque matrix, or individual motors, pairs of motors, or other combinations of motors, can have a surrounding ring or cowling that acts in place of a traditional tail rotor of a helicopter and that is connected to the helicopter via a pivot that can be used to direct the thrust of one or more motors of the anti-torque matrix. Alternatively, individual fixed blade pitch electrically or hydraulically-driven, variable-speed motors can each have a surrounding ring or cowling that is connected to a pivot. The combined blades of the various tail rotor motors that form the module can each provide separate thrust. The anti-torque matrix fixed can include two, three, four, five, six, seven, eight, nine, ten or more individual fixed blade pitch variable-speed motors, which can operate alone or in one or more combinations and in one or more directions. Further, the present invention includes having co-axial (or offset) pairs of motors that are positioned in parallel to provide outward thrust.

When provided within a cowling, the various vortices can be captured to form a circulating air pattern, which can act as a pump to draw additional air through the center of the fixed blade pitch electrically or hydraulically-driven, variable-speed motors from the region adjacent the upstream surface of motors. The circulating air pattern and eduction can increase the diameter of the wake and the volume of air transported by the anti-torque matrix. The wake of the anti-torque matrix can be transported at a slow rate while including a greater mass of air by the operation of the combined fixed blade pitch electrically or hydraulically-driven, variable-speed motors, thus resulting in increased efficiency in the operation of the overall anti-torque matrix that acts as a tail rotor.

By using smaller individual electric motors, each having their own fixed pitch propeller, the overall rotational energy of each propeller is much smaller and can even use softer or even frangible materials that will protect any ground crews when coming into contact during a hover or slow flight, while still providing the additive aerodynamic forces to control aircraft yaw, roll or pitch in forward flight.

The fixed blade pitch electrically or hydraulically-driven, variable-speed motors can provide longitudinal pitch trim and lateral yaw trim. In cruise mode, the flow axis of the fixed blade pitch electrically or hydraulically-driven, variable-speed motors is aligned generally with or along the long axis of the fuselage to serve as a horizontal stabilizer. In hover mode, the arrangement of the fixed blade pitch electrically or hydraulically-driven, variable-speed motors eliminates the down load of a horizontal tail surface that may arise due to interference with the down wash from the main rotor. The fixed blade pitch electrically or hydraulically-driven, variable-speed motors can also off-load the anti-torque matrix in forward flight by positioning itself with a yaw-direction incidence angle via a pilot trim control, thereby reducing power consumption. The anti-torque matrix presents a surface area in sideward flight, and can thereby serve in a passive roll as a yaw damper. The anti-torque matrix can also help reduce the size of a horizontal stabilizer. Alternatively or in addition, application of the anti-torque matrix can allow for the elimination of both vertical and horizontal surfaces normally utilized on conventional helicopters. This can allow a reduction in weight, download for a horizontal stabilizer in the rotor wake and reduced projected side area and drag in lateral (side) flight.

The present invention addresses the limitations of current electric motor technology and takes advantage or the unique performance capabilities of electric motors for use in helicopter anti torque control. Currently available electric motor technology has limited practicality for use as direct replacements of mechanical drive trains, turbine engines or internal combustion (IC) engines on aircraft. This is because in spite of recent advances in electric motor and battery technology, the comparable power density (power output per unit weight of a motor) becomes less practical with increasing motor size. This is why electric motors work so well on small, unmanned aircraft, but are still impractical for more than limited range use on very fight fixed wing aircraft.

The invention takes advantage of the unique performance capabilities of electric motors for use in helicopter anti-torque control. Using this distributed electric propulsion design and today's flight control technology, each motor can be controlled independently to vary individual motor thrust, and thereby position the anti-torque matrix (hinged at the center and free to rotate about the vertical axis) for optimum overall thrust (direction and magnitude). In hover mode, a helicopter requires anti-torque thrust perpendicular to the airframe's centerline. As the helicopter increases its forward airspeed, this perpendicular thrust requirement reduces. As the anti-torque thrust requirement reduces, the speed of the motors can be varied to optimize power utilization and overall aircraft performance.

Since electric motor power density becomes less practical with increasing motor size, "distributed propulsion" makes use a larger quantity of smaller motors. Combining the shaft output of multiple small motors into a single shaft output using a gearbox wipes out any weight savings and introduces thermal issues, which can require the addition of fluid cooling systems and even more weight. However, by distributing multiple small motors over the airframe, the total aircraft structural weight can be reduced by spreading smaller propulsion induced loads across the entire aircraft. Separating the motors by at least a rotor diameter also provides effective convection cooling. With existing electric power storage technology (batteries, fuel cells) the application of distributed propulsion on manned fixed wing aircraft is becoming more practical, but range is very limited. In the event of depletion of stored energy a fixed wing aircraft can still possibly glide to a safe landing. This is not the same case with application of Distributed Propulsion for lift propulsion on helicopters. On helicopters with distributed propulsion, the rotational inertia of the multiple small rotors is inadequate to support autorotation for safe landing. This combined with the higher power demands required for vertical lift rotors makes pure electric helicopters impractical until a dramatic increase in electric power storage technology occurs.

On manned helicopter configurations incorporating distributed propulsion, a dedicated system for anti-torque control is not required. Multiple small rotors cancel out each others torque and changing rotor speeds can generate control yaw. Therefore, the application of Distributed Propulsion specifically for anti-torque control appears to have been overlooked.

For example, using a Bell model 407 tail rotor for sizing analysis, using existing commercially available electric Sport Light application electric motors and propellers, it is possible to generate equivalent thrust with a matrix of 3×3 or 4×4 fixed blade pitch electric motor modules in approximately the same disc area. With an approximate fixed blade pitch electric motor module conservative weight of 5 pounds (2.2 kilos) (for 3×3 matrix), the total weight minus structure and system installation is 45 pounds (20 kilos). This weight is comparable to the current 407 rotor and gearbox weight. The one starter/generator on the 407 does not provide adequate power or reliability to support operation of the matrix of fixed blade pitch motor modules of the present invention. However, the elimination of the tail rotor output shaft provides for a main gearbox accessory drive pad to mount redundant generators. Because the added generator capacity is over sized for safety reliability, with both generators operating approximately 40 kW power can be made available for non-flight critical uses. Similar calculations apply to the use of hydraulic motors.

Another advantage of the use of a matrix of fixed blade pitch motor modules is that, in the event of loss of all aircraft engine power, the power demand for anti-torque control thrust becomes minimal. Therefore, the impact on the aircrafts electric power systems and rotor energy is also minimal in the event of an auto rotation landing. With increasing forward flight speed the interaction of airflow between rotors results in the aft-most rotors losing their effectiveness. Commensurately, with increasing forward speed the anti-torque thrust required decreases. Therefore with increasing forward speed the aft most modules will be progressively shut off to eliminate unneeded power consumption and reduce noise.

The present invention can use at least one of an electric and/or a hydraulic motor. Non-limiting examples of electric motors for use with the present invention include: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor. Non-limiting examples of hydraulic motors for use with the present invention include: a gear and vane motor, a gerotor motor, an axial plunger motor, a constant pressure motor, a variable pressure motor, a variable flow motor, or a radial piston motor.

FIG. 1 is a side-view schematic diagram of a helicopter 100 having the anti-torque matrix 110, depicted in this version with nine fixed blade pitch motors 112a-112i, which can be fixed blade pitch electrically or hydraulically-driven and/or variable-speed motors. The helicopter 100 includes a rotary system 102 carried by a fuselage 104. Rotor blades 106 connected to the rotary system 102 provide flight for the helicopter 100. The rotor blades 106 are controlled by multiple controllers within the fuselage 104. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108, which supports the anti-torque matrix 110 at the aft end. Each of the fixed blade pitch motors 112a-112i can be operated individually or in groups to provide counter-torque force for transversely stabilizing the helicopter 100. Each of the fixed blade pitch motors 112a-112i is mounted as part of the anti-torque matrix 110 on the tail boom 108. The anti-torque matrix 110 is centered on a hub such that a leading edge of the anti-torque matrix 110 is presented to the side of the helicopter 100 toward the tail boom 108. For example, when a single main rotor the helicopter 100 is rotating counter-clockwise when viewed from above, the leading edge of anti-torque matrix 110 is to the right (starboard) side of the helicopter 100.

Figure 2:
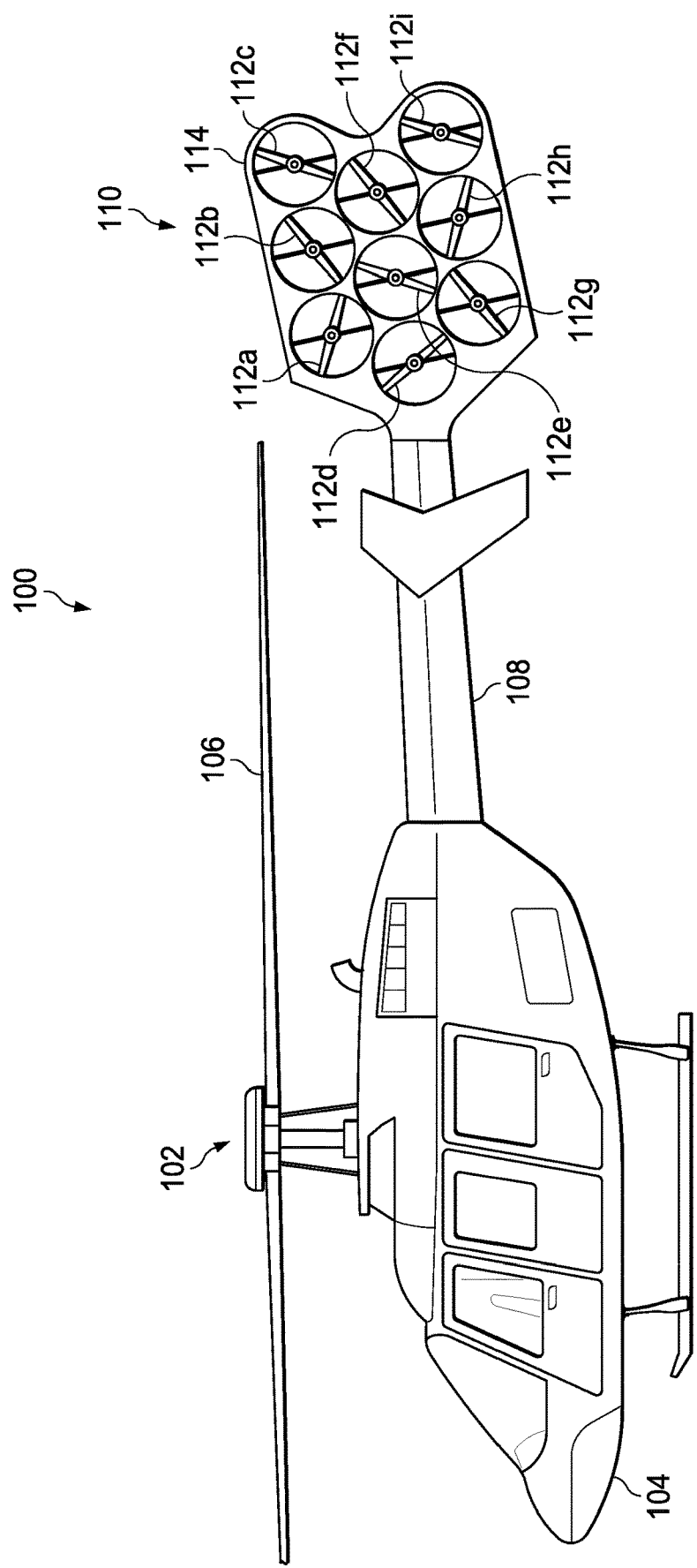
FIG. 2 shows the use of multiple ducted rotors to generate anti torque thrust.

FIG. 2 shows the use of multiple ducted rotors to generate anti torque thrust. In this example a helicopter 100 has the anti-torque matrix 110, depicted in this version with nine fixed blade pitch motors 112a-112i, which can be fixed blade pitch electrically or hydraulically-driven and/or variable-speed motors, each of which are individually ducted. The anti-torque matrix 110 can further include a surface 114 that forms part of the ducting for the nine fixed blade pitch motors 112a-112i. As is the case with the helicopter in FIG. 1, the helicopter 100 includes a rotary system 102 carried by a fuselage 104. Rotor blades 106 connected to the rotary system 102 provide flight for the helicopter 100. The rotor blades 106 are controlled by multiple controllers within the fuselage 104. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108, which supports the anti-torque matrix 110 at the aft end, which also permits rotation of the anti-torque matrix 110 about the longitudinal axis of the tail boom 108. Each of the fixed blade pitch motors 112a-112i can be operated individually or in groups to provide counter-torque force for transversely stabilizing the helicopter 100. Each of the fixed blade pitch motors 112a-112i is mounted as part of the anti-torque matrix 110 on the tail boom 108. The anti-torque matrix 110 is centered on a hub such that a leading edge of the anti-torque matrix 110 is presented to the side of the helicopter 100 toward the tail boom 108. For example, when a single main rotor the helicopter 100 is rotating counter-clockwise when viewed from above, the leading edge of anti-torque matrix 110 is to the right (starboard) side of the helicopter 100.

In operation, the anti-torque matrix 110 is oriented substantially in-plane with the tail boom 108 of the helicopter 100 during a first mode of helicopter operation. The skilled artisan will recognize that the anti-torque matrix 110 may be a first anti-torque matrix 110, with a second anti-torque matrix 110 that is substantially parallel to the first providing additional motors and fixed pitch blades that, generally, will be facing outwardly from each other, with the motors being in the center of the anti-torque matrix 110. Generally, the motors will be co-axial, however, in certain embodiments the motors do not have to be co-axial. Further, while FIGS. 1 and 2 shows the anti-torque matrix 110 are being in the form of a 3×3 matrix, that is generally rhomboid in shape, the skilled artisan will recognize that the anti-torque matrix 110 can have any shape and include 2, 3, 4, 5, 6, 7, 8, 9, 10, 11, 12, 13, 14, 15 or more motors, which motors could also be in co-axial pairs. Further, the anti-torque matrix 110 can have any shape, such as round, oval, crescent-shaped, J-shaped, diagonal, square, rectangular, triangular, pentagonal, hexagonal, polygonal, rhomboid, trapezoid, X-shaped, Y-shaped, or kite shaped, For example, the first mode of helicopter operation is a hover mode, which is typically a mode in which the helicopter 100 is sitting on or about the ground with the anti-torque matrix 110 provides thrust from the one or more fixed blade pitch motors 112a-112i when the helicopter 100 is operating in slow speed flight. In this orientation, the anti-torque matrix 110 can provide maneuverability and trim to the helicopter operation. During hover, the direction of thrust of the one or more fixed blade pitch motors 112a-112i of the anti-torque matrix 110 can be in opposing directions, for example, one subset of motors can direct their thrust in one direction, while another subset can be directed in the opposite direction to provide finer rotational control to the helicopter 100. Of course, the speed of the individual motors can also be varied, under control of a logic in a flight control computer that calculates the position of the anti-torque matrix 110 during transition to and from the first to the second mode of operation and for independently controlling individual fan speeds to position the matrix for optimum thrust angle, as well as optimum thrust magnitude.

In a second mode of operation, the anti-torque matrix 110 is oriented substantially off-plane with the tail boom 108 of the helicopter 100 during a second mode of helicopter operations that is different from the first mode. For example, the second mode of helicopter operation is a flight mode (e.g., a low to high speed forward flight mode). In the flight mode, the orientation of the anti-torque matrix 110 is changed from being substantially co-planar with the tail boom 108 to being non-planar. For example, the anti-torque matrix 110 can be substantially perpendicular with the plane of the tail boom 108, by pivoting about pivot. Alternatively, the orientation of the anti-torque matrix 110 can be anywhere between co-planar and perpendicular relative to the tail boom 108.

FIGS. 3A-3F and FIGS. 4A-4F show several variations of the matrix patterns of the variable speed motors of the present invention that provide higher efficiency and reduced overall size. The skilled artisan will recognize that there are an infinite number of possible variations of number of rotors and pattern of rotor positions when using 2, 3, 4, 5, 6, 7, 8, 9, 10, 11, 12, 13, 14, 15 or more electric and/or hydraulic motors. Of course, the different motors could also be ducted in groups of 2, 3, 4, 5, or more, again, having a variety of shapes and sizes. In addition, different motors could be different sizes and also the blades could also vary in size throughout the matrix.

Figure 3A:
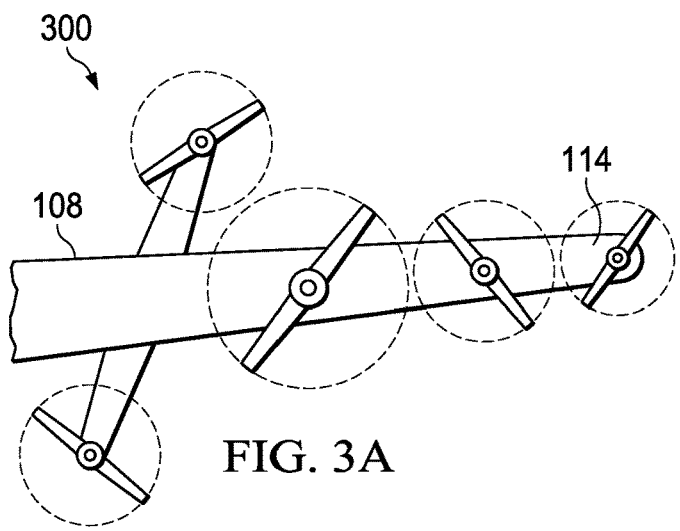
FIGS. 3A-3F show various schematic diagrams of anti-torque matrix, of the present invention that provide higher efficiency and reduced overall size.
Figure 3B:
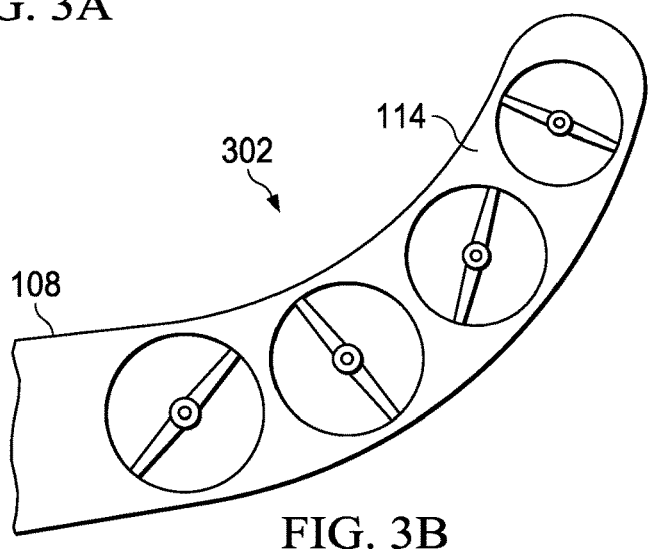
Figure 3C:
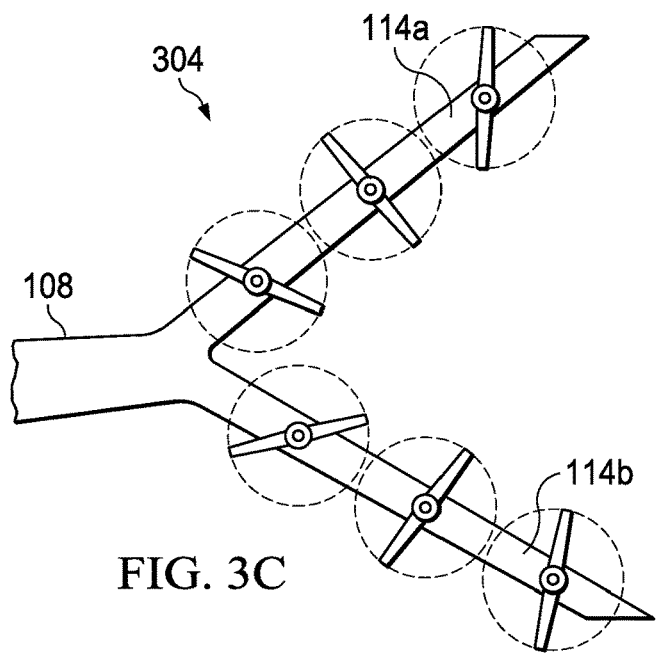
Figure 3D:
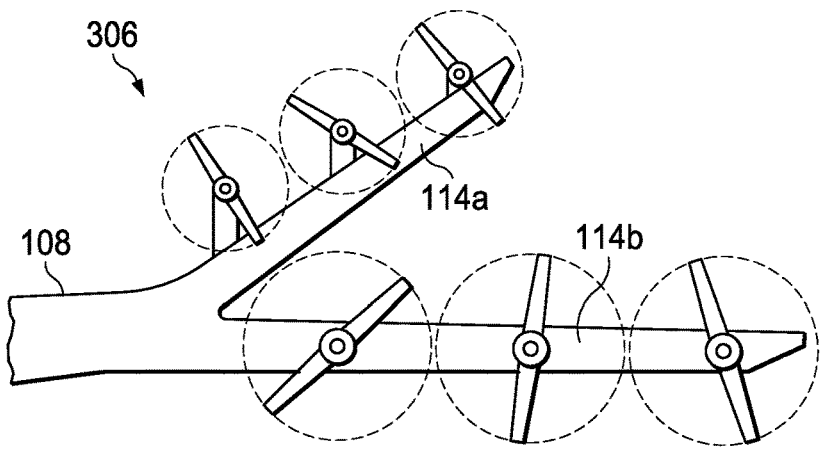
Figure 3E:
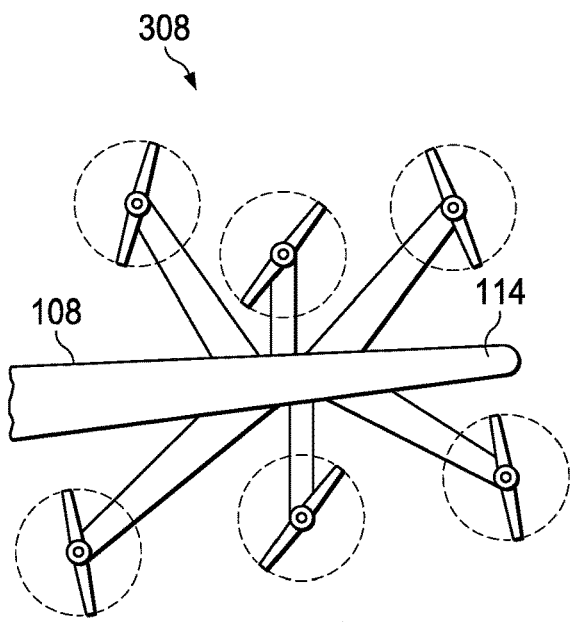
Figure 3F:
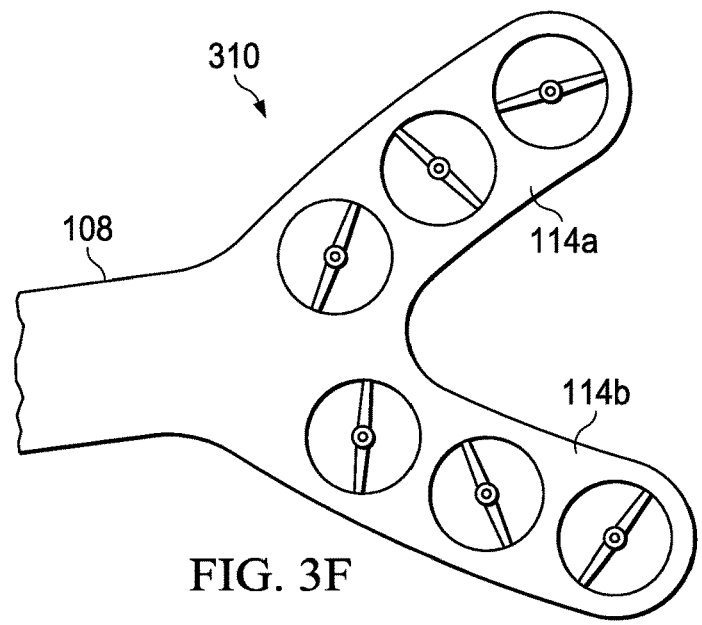
Figure 4A:
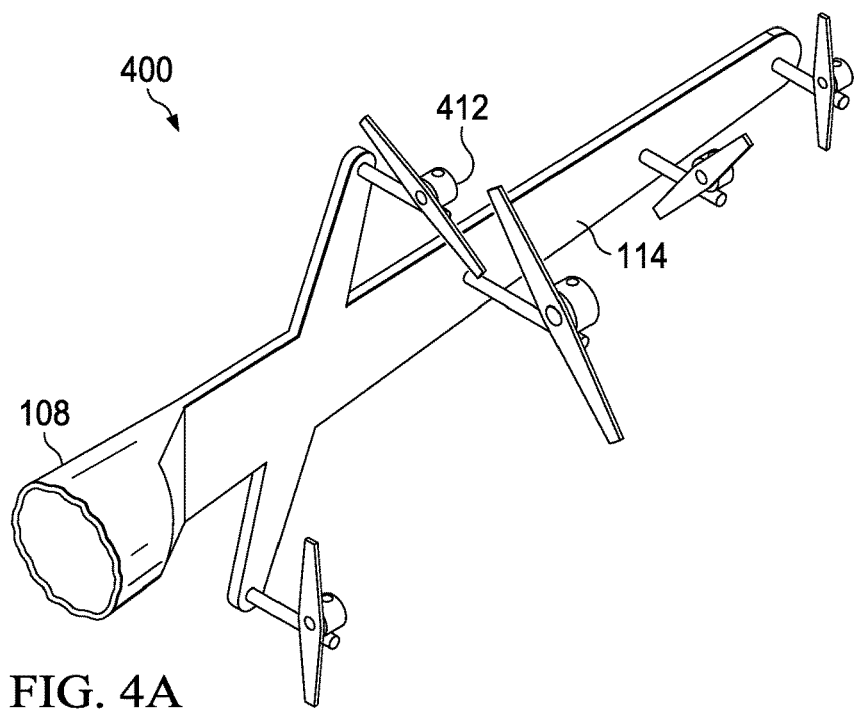
FIGS. 4A-4F show various schematic diagrams of anti-torque matrix, of the present invention that provide higher efficiency and reduced overall size.
Figure 4B:
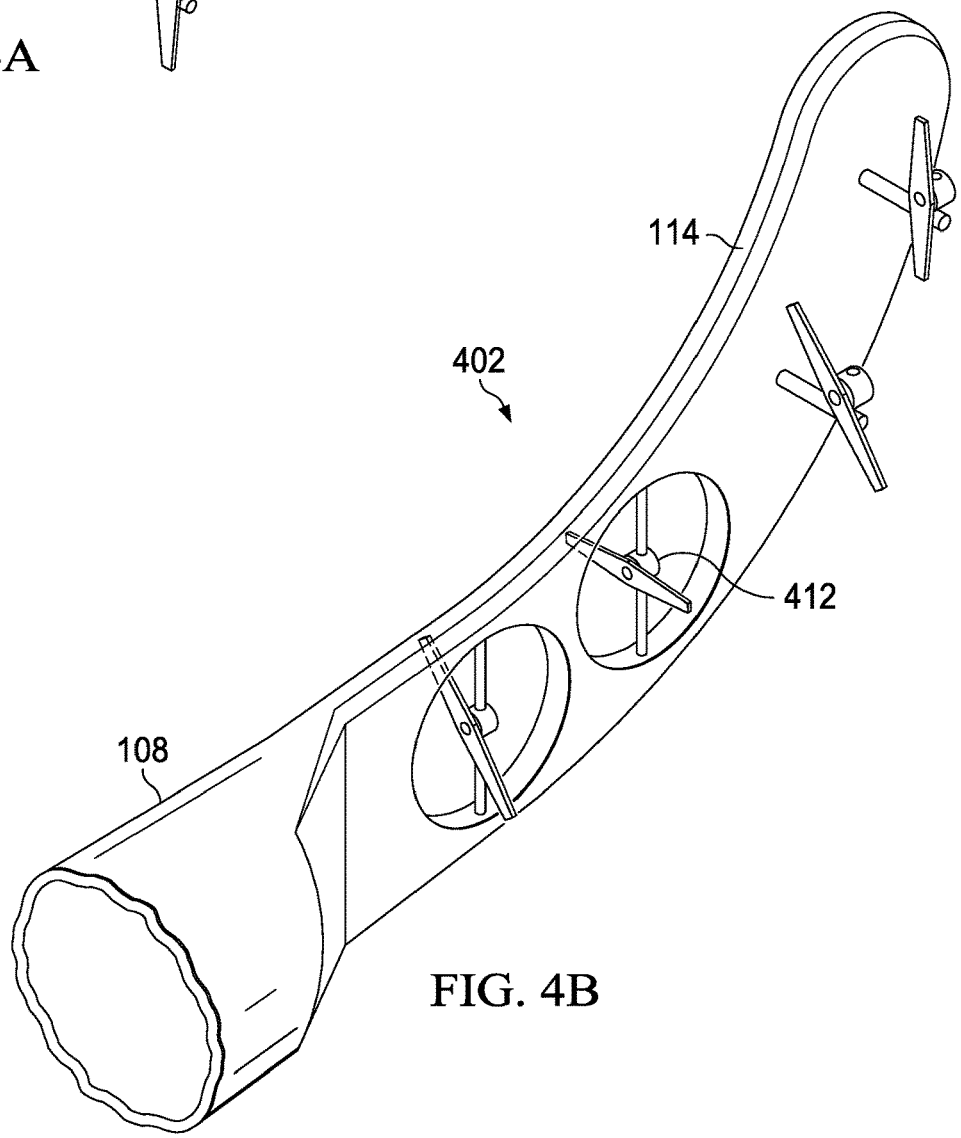
Figure 4C:
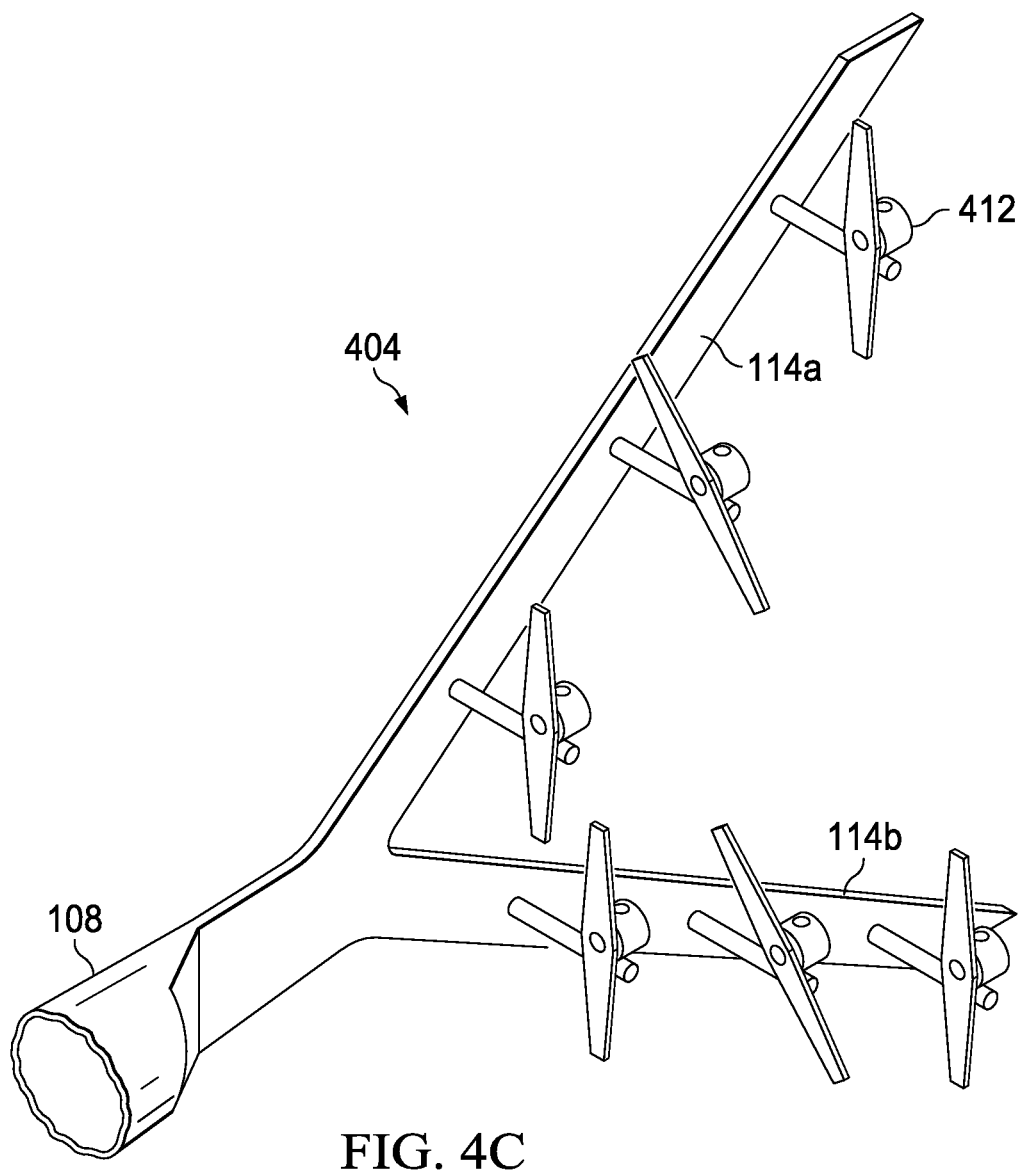
Figure 4D:
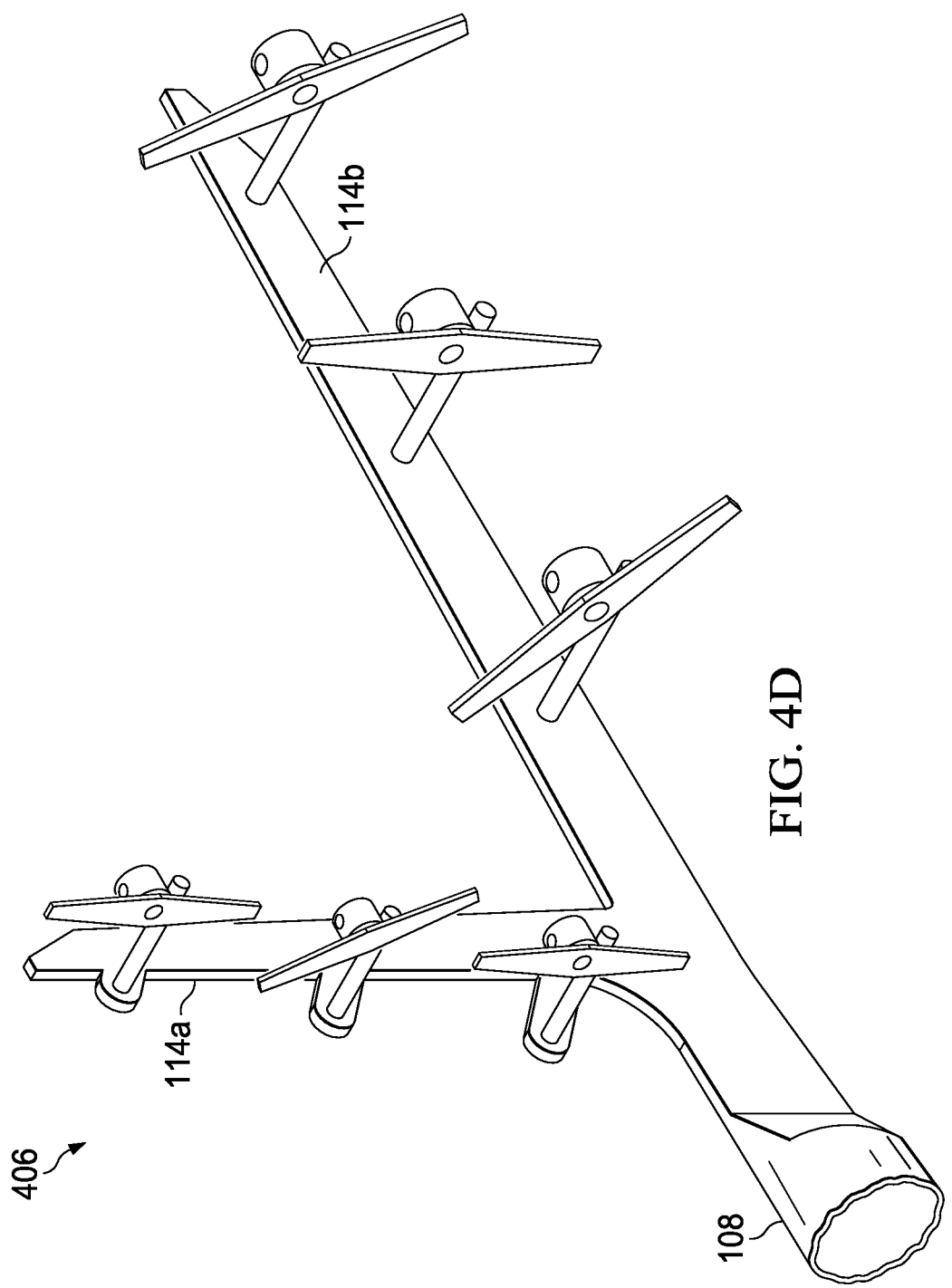
Figure 4E:
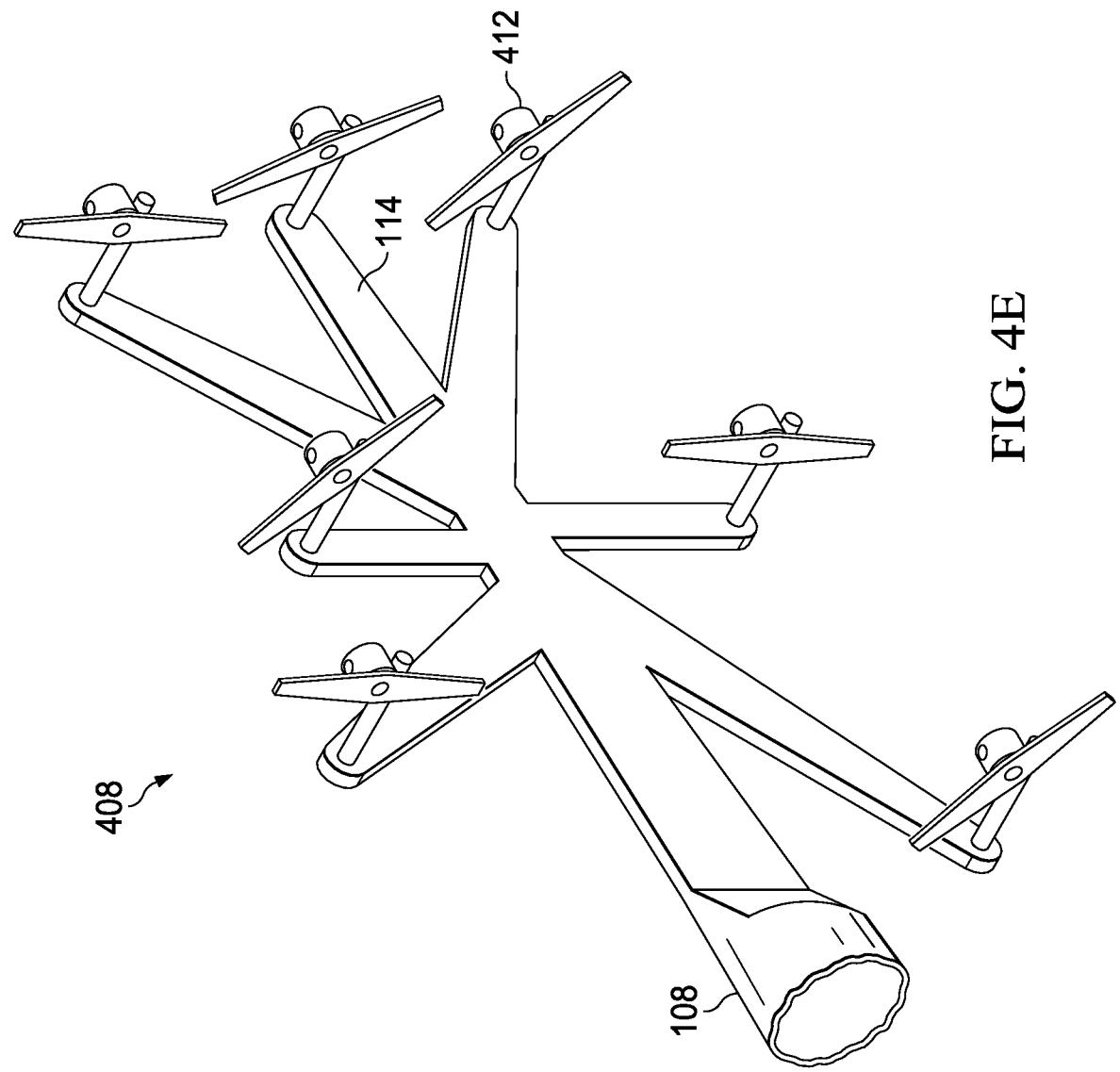
Figure 4F:
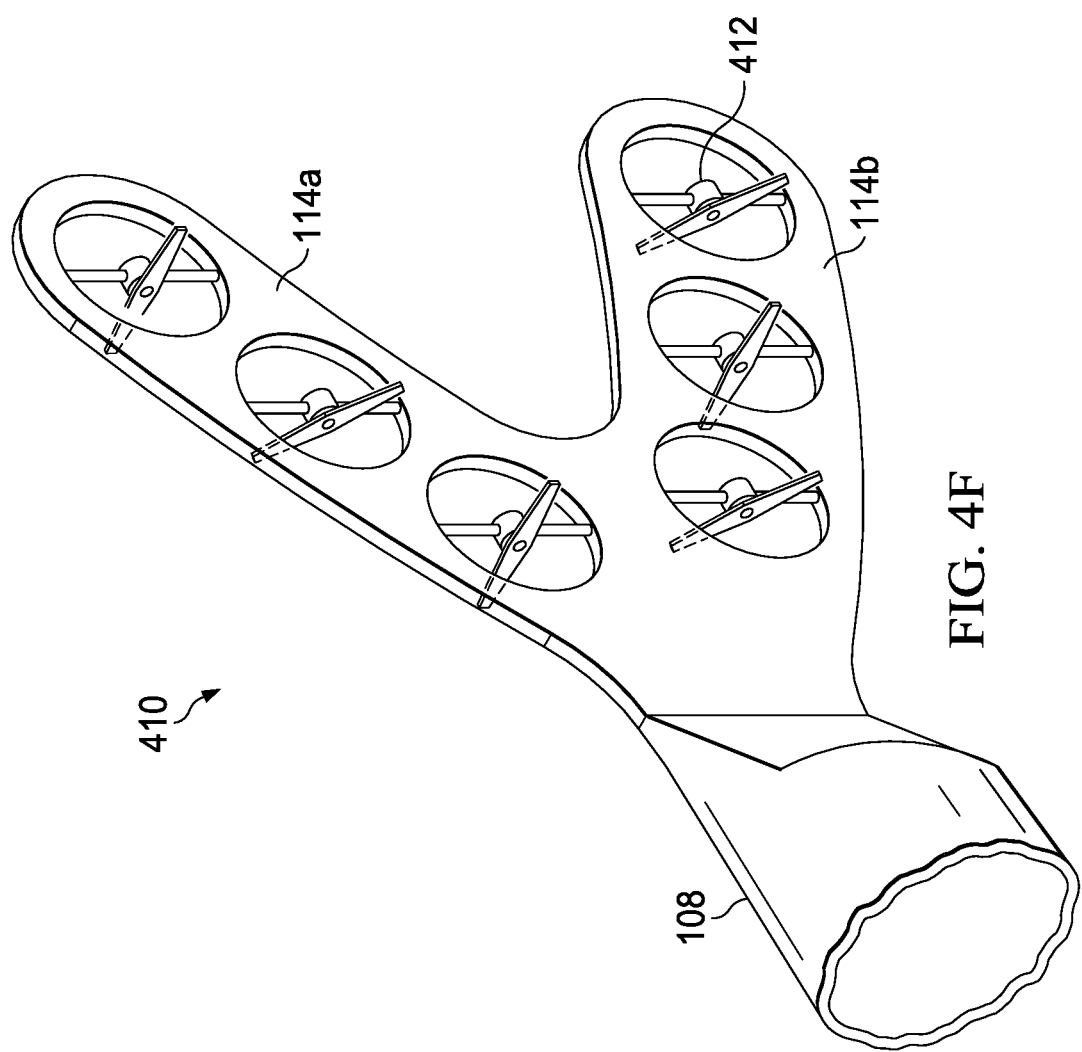

FIGS. 3A to 3F, and 4A to 4F show various schematic diagrams of anti-torque matrix with the tail boom 108 of the helicopter 100. In FIG. 3A the anti-torque matrix 300 is mounted to the tail boom 108 having a surface 114 and is depicted as having various electric motors and fixed pitch angle blades that are of different sizes and generally forming a triangular shape, with the apex of the triangle facing aft and the anti-torque matrix 110 being generally vertical. FIG. 4A shows the same configuration as in FIG. 3A, in this case the anti-torque matrix 400 is depicted with a pivot 412. FIG. 3B shows an anti-torque matrix 302 is mounted to, or integral with, the tail boom 108 having a surface 114 and is depicted as having a J-shape in which the various electric motors and fixed pitch angle blades have about the same size and are ducted. FIG. 4B shows a same configuration as in FIG. 3B, in this case the anti-torque matrix 402 is depicted with a pivot 412. However, in this configuration the anti-torque matrix 402 shows a combination of in-plane variable speed motors and off-plane variable speed motors, which can also apply to all the configurations shown herein. FIG. 3C shows an anti-torque matrix 304 is mounted to the tail boom 108 having surfaces 114a and 114b and is depicted as having various electric motors and fixed pitch angle blades that are about the same size and generally form a triangular shape with the apex of the triangle facing forward. In FIG. 3C, the anti-torque matrix 304 oriented off-plane with the tail boom 108 of the helicopter 100, that is, the anti-torque matrix 304 has been rotated on a Z-axis that passes between the upper end axis 114a and the lower end axis 114b perpendicular from an in-plane orientation. In some implementations, the anti-torque matrix 304 can be pivoted on a horizontal X-axis to provide yaw control of the helicopter 100. FIG. 4C shows the same configuration as in FIG. 3C, in this case the anti-torque matrix 404 is depicted with a pivot 412. FIG. 3D shows an anti-torque matrix 306 is mounted to the tail boom 108 having surfaces 114a and 114b and is depicted as having various electric motors and fixed pitch angle blades that are about the same size and generally form a triangular shape with the apex of the triangle facing forward, however, in this embodiment the fork is horizontal. FIG. 4D shows the same configuration as in FIG. 3D, in this case the anti-torque matrix 406 is depicted with a pivot 412. FIG. 3E shows an anti-torque matrix 308 is mounted to the tail boom 108 having a surface 114 and is depicted as having various electric motors and fixed pitch angle blades that are about the same size and generally form an X-shape, with two additional motors. FIG. 4E shows the same configuration as in FIG. 3E, in this case the anti-torque matrix 408 is depicted with a pivot 412. FIG. 3F shows an anti-torque matrix 310 is mounted to the tail boom 108 having surfaces 114a and 114b and is depicted as having various electric motors and fixed pitch angle blades that are about the same size and generally form a crescent shape with the apex of the crescent facing forward. FIG. 4F shows the same configuration as in FIG. 3F, in this case the anti-torque matrix 410 is depicted with a pivot 412.

FIGS. 4A to 4F shows that a pivoting mechanism can be included with one or more of the fixed pitch rotors in the anti-torque matrix 400-410 at the end of the tail boom 108 of the helicopter 100. In some implementations, the pivoting mechanism can be electric, or can even be a bell crank system and can include a pulley cable system connected to the bell crank system. The pivoting mechanism can be controlled by an operator of the helicopter 100 to orient the anti-torque matrix 400-410 substantially in-plane with the tail boom 108 of the helicopter 100 during a first mode of helicopter operation, and to orient the anti-torque matrix 400-410 substantially off-plane with the tail boom 108 of the helicopter 100 during a second mode of helicopter operation that is different from the first mode. In a fly-by-wire configuration, the pivoting mechanism can be controlled by a logic in a flight control computer that calculates the position of the anti-torque matrix 400-410 during transition to and from the first to the second mode of operation and for independently controlling individual fan speeds to position the matrix for optimum thrust angle, as well as optimum thrust magnitude.

Figure 5B:
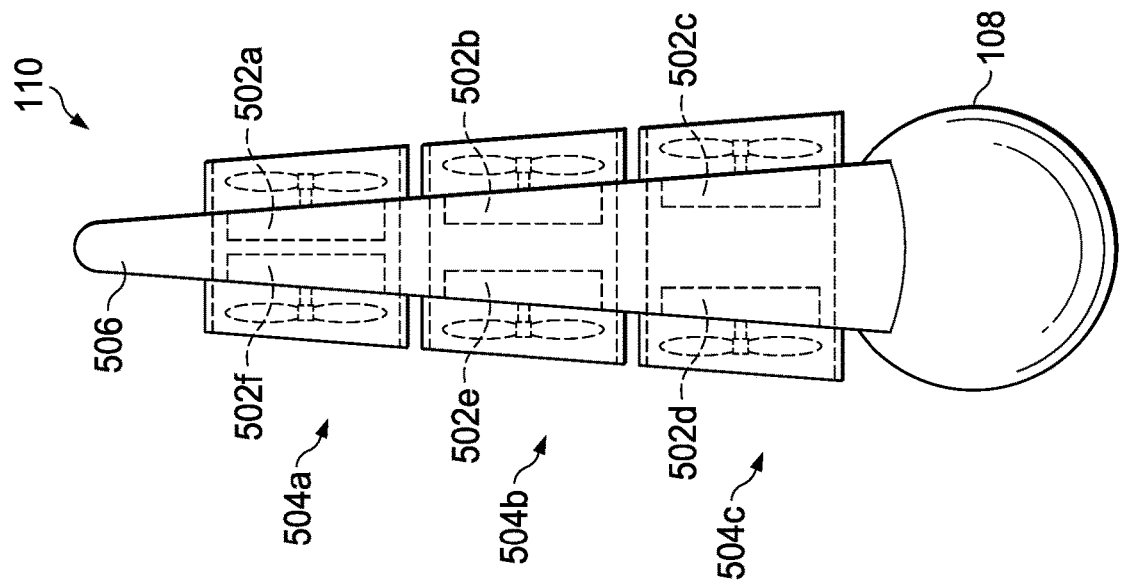
FIGS. 5A and 5B show to variants of co-axially positioned motors with outwardly facing fixed pitch blades of the present invention.
Figure 5A:
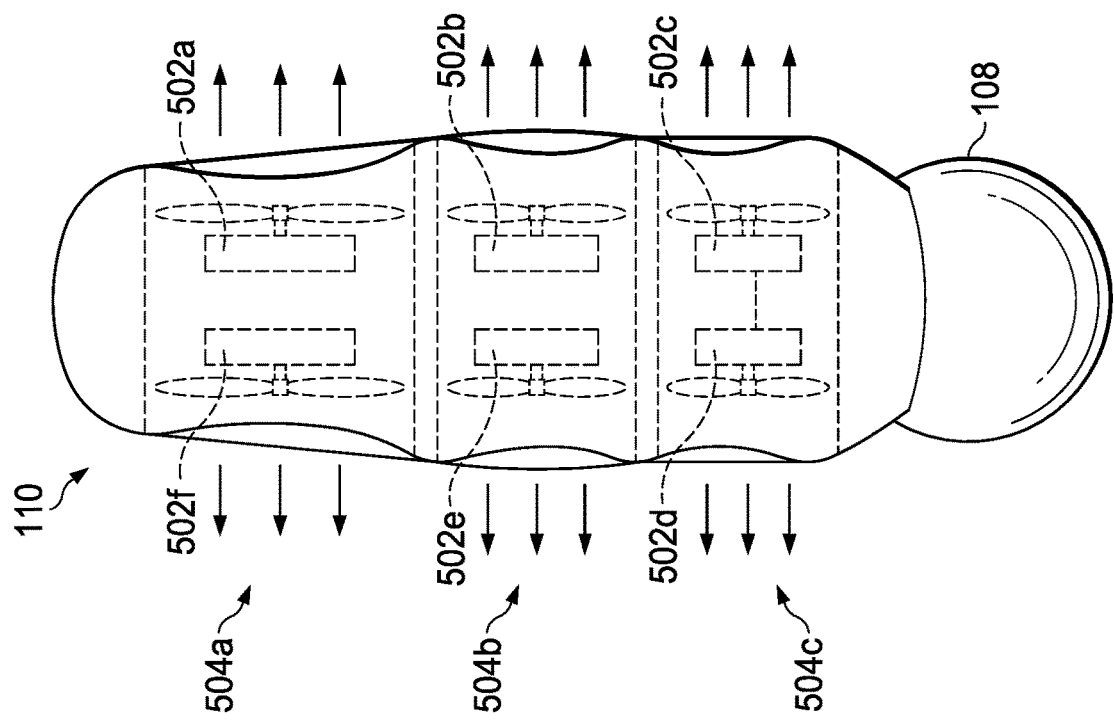

FIG. 5A is a rear, end view of the anti-torque matrix 110 depicted in this version as sitting on the tail boom 108, wherein the anti-torque matrix 110 can be included at the end of the tail boom 108 comprises two parallel sets of variable speed motors and fixed angle blades 502a to 502f, that are shown within the body of the anti-torque matrix 110, wherein the variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors that are internal to the tail boom. The skilled artisan will recognize that if the anti-torque matrix 110 has 6, 9, 12, or other number of pairs of motors, the end view only permits showing, in this version, the closest motors (502a-502f), however, additional pairs of motors and ducts can also be found forward from these motors.

FIG. 5B is a rear, end view of the anti-torque matrix 110 depicted in this version as sitting on the tail boom 108, wherein the anti-torque matrix 110 can be included at the end of the tail boom 108 comprises two parallel sets of variable speed motors and fixed angle blades 502a to 502f, that are shown to extend from the mast 506 of the anti-torque matrix 110, wherein the variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors. The skilled artisan will recognize that if the anti-torque matrix 110 has 6, 9, 12, or other number of pairs of motors, the end view only permits showing, in this version, the closest motors (502a-502f), however, additional pairs of motors and ducts can also be found forward from these motors.

Figure 6B:
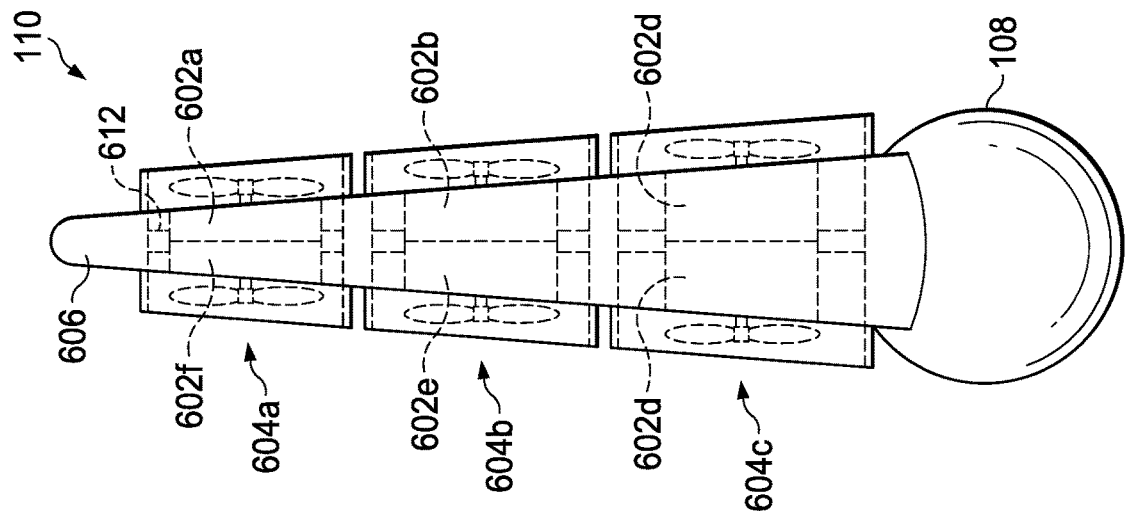
FIGS. 6A and 6B show to variants of co-axially positioned motors with outwardly facing fixed pitch blades of the present invention.
Figure 6A:
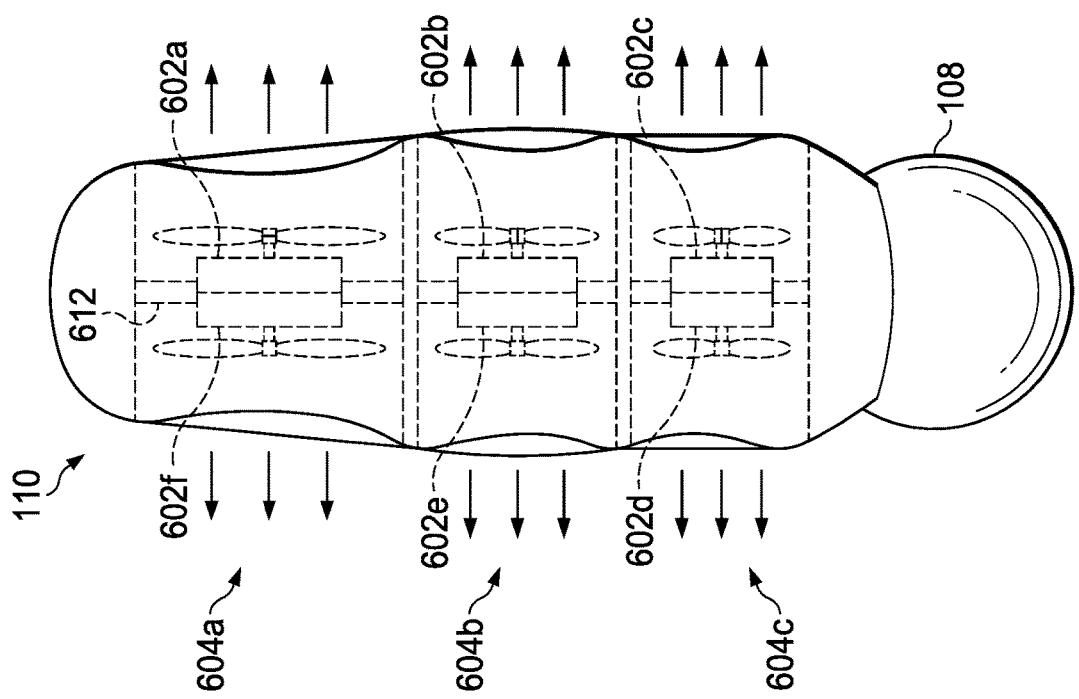

FIGS. 6A and 6B show the same configuration as FIGS. 5A and 5B, but in this configuration the motors 602a-602f are connected to a pivoting mechanism 612. The pivoting mechanism 612 can be electric, mechanical, or can even be a bell crank system and can include a pulley cable system connected to the bell crank system. In the configurations shown in FIGS. 6A and 6B, the aft portion of the anti-torque matrix 110 is fitted with rearward grooves or openings in the aft portion of the tail rotor, for example, at mast 606, to add thrust to the rotorcraft. The pivoting mechanism can be controlled by an operator of the helicopter 100 to orient the anti-torque matrix 110 substantially in-plane with the tail boom 108 of the helicopter 100 during a first mode of helicopter operation, and to orient the anti-torque matrix 110 substantially off-plane with the tail boom 108 of the helicopter 100 during a second mode of helicopter operation that is different from the first mode. In a fly-by-wire configuration, the pivoting mechanism can be controlled by a logic in a flight control computer that calculates the position of the anti-torque matrix 110 during transition to and from the first to the second mode of operation and for independently controlling individual fan speeds to position the matrix for optimum thrust angle, as well as optimum thrust magnitude.

Figure 7:
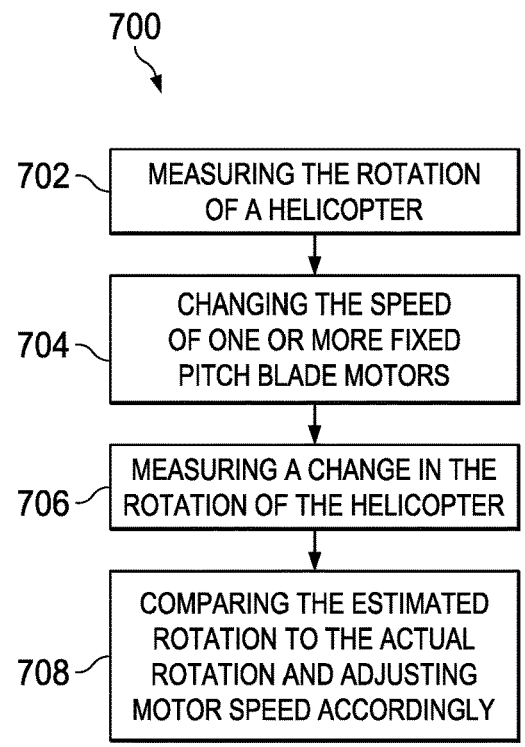
FIG. 7 shows a flowchart of a control logic for controlling the rotation of a helicopter that comprises the variable speed motors and fixed angle blades in a matrix pattern.

FIG. 7 shows a flowchart of a control logic 700 for controlling the rotation of a helicopter that comprises the variable speed motors and fixed angle blades in a matrix pattern. In step 702, the control logic 700 that can be, e.g., in a flight control computer, receives measurements of the rotation of the helicopter from, e.g., a rotation sensor. In step 704, the control logic 700 changes the speed of the one or more variable speed motors to increase torque or anti-torque to a desired rotation, which rotation can include no rotation. The control logic 700 can include looking up a table of known or estimated torque calculations or formulas for each of the variable speed motors depending on the size of the motor, fixed pitch blade, or position in the matrix. The position of the variable speed motors in the matrix will significantly affect their individual effect on the rotation of the helicopter. For example, assuming all the variable speed motors and fixed pitch blades are of equivalent size and power, then the variable speed motors and fixed pitch blades that are at the aft-most position will have the greatest effect on torque, while variable speed motors and fixed pitch blades that are fore from other motors will have less overall torque, assuming the same speed. As such, the control logic 700 can look-up the estimated or measured effect on torque for each individual motor (or pairs of motors if co-axial), and then increase or decrease the speed to adjust the rotation of the helicopter. In step 706, the control logic 700 receives data from the rotation sensor that reflects actual helicopter rotation and in step 708, compares the estimate or calculated rotation of the helicopter versus actual rotation and can then adjust motor speed to change the speed of one or more of the variable speed motors and fixed pitch blades to control rotation, if any.

Figure 8:
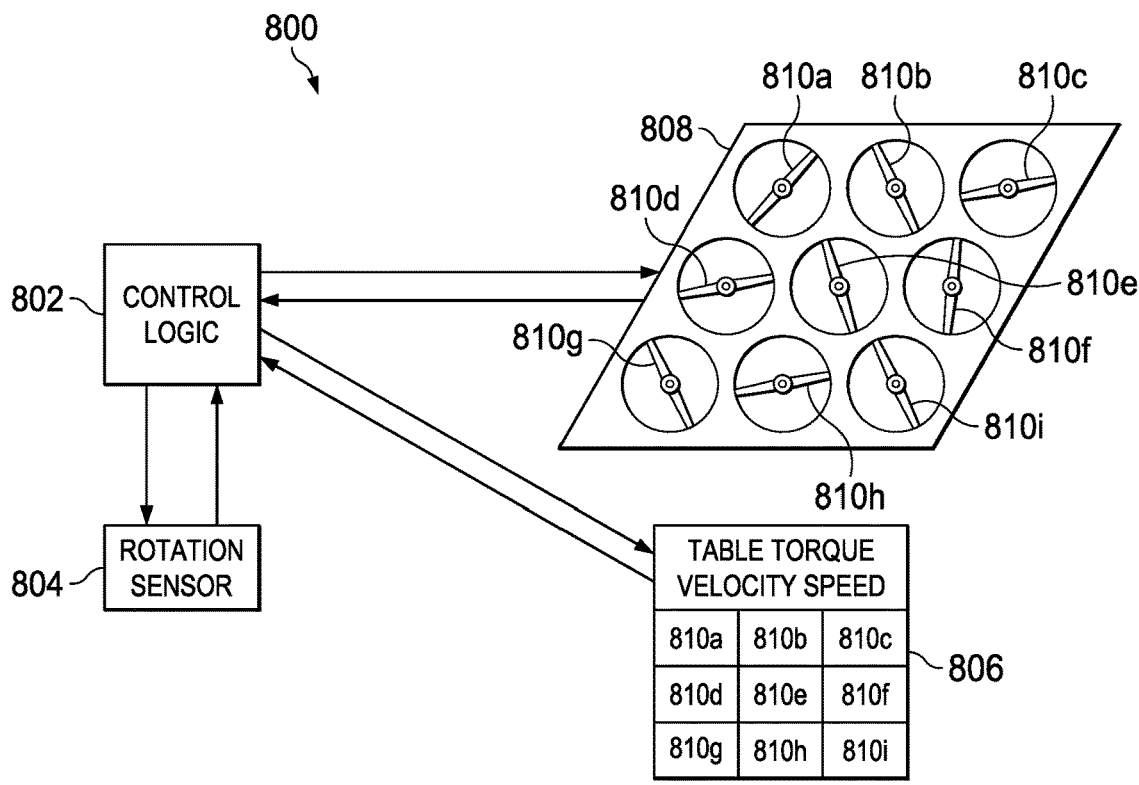
FIG. 8 shows a rotation control system for use with the plurality of variable speed motors arranged in a first or a first and a second matrix.

FIG. 8 shows a rotation control system 800 for use with the plurality of variable speed motors arranged in a first or a first and a second matrix. A control logic 802 is connected to a rotation sensor 804. The control logic 802 is also connected and controls the speed of the one or more fixed pitch blade variable speed motors 810a-810i that are part of anti-torque module 808. The control logic 802 is also connected to a table 806 that includes the calculated torque versus speed for each of the one or more fixed pitch blade variable speed motors 810a-810i. The control logic 802 looks up estimated torques for the motors to adjust the speed of the motors based on a user-input for overall helicopter rotation (if any), then measures actual rotation, and finally adjusts the speed and torque of the one or more fixed pitch blade variable speed motors 810a-810i during flight operations.

A number of implementations have been described. Nevertheless, it will be understood that various modifications may be made without departing from the spirit and scope of the disclosure. In some implementations, the fixed blade pitch electric motor module can be controlled by pilot inputs in combination with the operating status of the air vehicle (e.g., hover, transition or forward flight). In implementations in which the rotorcraft is operated using some form of fly-by-wire or fly-by-light control systems, the fixed blade pitch electric motor module operation can be controlled by the computer system, which, in turn, can get cues from the pilot's inputs, etc.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An aircraft comprising:
   a tail boom;
   a plurality of first variable-speed motors mounted on the tail boom; and
   a control logic configured to:
   measure a rotation of the aircraft in response to a baseline speed of the plurality of first variable-speed motors;
   change a speed of one or more of the plurality of first variable-speed motors;
   measure a change in the rotation of the aircraft in response to the change in the speed of the one or more of the plurality of first variable-speed motors;
   determine an estimated change in the rotation of the aircraft based on the change in the speed of the one or more of the plurality of first variable-speed motors;
   compare the measured change in the rotation of the aircraft to the estimated change in the rotation of the aircraft; and
   modify the speed of one or more of the plurality of first variable-speed motors based on the comparison.

2. The aircraft of claim 1, wherein the control logic is further configured to obtain an airspeed of the aircraft from an airspeed sensing system disposed at a forward portion of an airframe of the aircraft and reduce or increasing the speed of one or more of the plurality of first fixed blade pitch variable-speed motors to control a yaw or a response to transients on the aircraft during flight.

3. The aircraft of claim 1, wherein the control logic is further configured to:
   filter a noise from a data reflective of the change in the rotation of the aircraft;
   iteratively correct the data reflective of the change in rotation of the aircraft between the estimated change in rotation and the measured change in rotation; or
   provide a directional thrust using at least one of the plurality of first variable-speed motors, and the directional thrust comprises a starboard thrust, a port thrust, or both the starboard thrust and the port thrust concurrently.

4. The aircraft of claim 1, wherein the control logic compares the measured change to the estimated change by correcting data reflective of the change in rotation of the aircraft by reference to speed data for the one or more of the plurality of first variable-speed motors versus the change in rotation of the aircraft.

5. The aircraft of claim 1, wherein the estimated change in the rotation of the aircraft comprises no change in rotation of the aircraft, or an adjustment in a torque, a roll, or a yaw of the aircraft.

6. The aircraft of claim 1, wherein the control logic is further configured to calculate an overall torque generated by the plurality of first variable-speed motors, reduce or eliminate a torque, reduce or eliminate transients, maximize a thrust, reduce an overall tail rotor noise, manage wear on each of the plurality of first variable-speed motors, monitor a vortex ring state at a tail rotor, pulse the plurality of first variable-speed motors to reduce or eliminate the vortex ring state, control at least one of a position or a speed of one or more of the plurality of first variable-speed motors mounted on individual pivots, or control at least one of the position or the speed of the plurality of first variable-speed motors if the plurality of first variable-speed motors rotate around a longitudinal axis of the tail boom.

7. The aircraft of claim 1, further comprising a plurality of second variable-speed motors mounted on the tail boom of the aircraft that are substantially parallel and planar with the plurality of first variable-speed motors.

8. The aircraft of claim 7, wherein the plurality of first variable-speed motors are coaxially aligned with the plurality of second variable-speed motors.

9. The aircraft of claim 1, wherein:
the plurality of first variable-speed motors are at least one of electric or hydraulic motors;
one or more of the plurality of first variable-speed motors are a different size;
the plurality of first variable-speed motors are arranged in a round, oval, crescent-shaped, J-shaped, diagonal, square, rectangular, triangular, pentagonal, hexagonal, polygonal, rhomboid, trapezoid, X-shaped, Y-shaped, or kite-shaped pattern;
the plurality of first variable-speed motors can be turned on or off independently, turned on or off as a group, turned one or off in pairs, or each of the plurality of first variable-speed motors can operate independently to direct thrust in a same or a different direction;
the plurality of first variable-speed motors are rotatable about a longitudinal axis of the tail boom; or
each of the plurality of first variable-speed motors is on a pivot that allows for rotation of the first variable-speed motor.

10. The aircraft of claim 1, further comprising:
one or more fixed pitch blades attached to each of the plurality of first variable-speed motors; and
wherein:
the one or more of the one or more fixed pitch blades are a different size;
a torque of each of the plurality of first variable-speed motors and the respective fixed pitch blade is based on a size, power and position of the first variable-speed motor and the respective fixed pitch blade;
the plurality of first variable-speed motors and the respective fixed pitch blades are individually ducted; or
a ring or cowling surrounds one or more of the plurality of first variable-speed motors and the respective fixed pitch blades.

11. An aircraft comprising:
a tail boom;
three or more variable-speed motors mounted on the tail boom; and
a control logic configured to:
measure a rotation of the aircraft in response to a speed of the three or more variable-speed motors;
change a speed of one or more of the three or more variable-speed motors to achieve an estimated rotation of the aircraft;
measure an actual rotation of the aircraft;
compare the estimated rotation of the aircraft to the actual rotation of the aircraft; and
adjust the speed of one or more of the three or more variable-speed motors based on the comparison.

12. The aircraft of claim 11, wherein the estimated rotation of the aircraft comprises no change in rotation of the aircraft, or an adjustment in a torque, a roll, or a yaw of the aircraft.

13. The aircraft of claim 11, wherein the control logic is further configured to:
look up an estimated or measured effect on a torque for each of the three or more variable-speed motor or pairs of the three or more variable-speed motors; and
determine the estimated rotation of the aircraft based on the estimated or measured effect on the torque.

14. The aircraft of claim 11, wherein the control logic is further configured to calculate an overall torque generated by the plurality of first variable-speed motors, reduce or eliminate a torque, reduce or eliminate transients, maximize a thrust, reduce an overall tail rotor noise, manage wear on each of the plurality of first variable-speed motors, monitor a vortex ring state at a tail rotor, pulse the plurality of first variable-speed motors to reduce or eliminate the vortex ring state, control at least one of a position or a speed of one or more of the plurality of first variable-speed motors mounted on individual pivots, or control at least one of the position or the speed of the plurality of first variable-speed motors if the plurality of first variable-speed motors rotate around a longitudinal axis of the tail boom.

15. The aircraft of claim 11, wherein the three or more variable-speed motors comprise:
three or more first variable-speed motors; and
three or more second variable-speed motors that are substantially parallel and planar with the three or more first variable-speed motors.

16. The aircraft of claim 15, wherein the three or more first variable-speed motors are coaxially aligned with the three or more second variable-speed motors.

17. The aircraft of claim 15, further comprising one or more fixed pitch blades attached to each of the three or more first variable-speed motors and the three or more second variable-speed motors, wherein all the fixed pitch blades are outwardly facing.

18. The aircraft of claim 11, wherein the control logic is further configured to provide a directional thrust using at least one of the three or more variable-speed motors, and the directional thrust comprises a starboard thrust, a port thrust, or both the starboard thrust and the port thrust concurrently.

19. The aircraft of claim 11, wherein:
the three or more variable-speed motors are at least one of electric or hydraulic motors;
one or more of the three or more variable-speed motors are a different size;
the three or more variable-speed motors are arranged in a round, oval, crescent-shaped, J-shaped, diagonal, square, rectangular, triangular, pentagonal, hexagonal, polygonal, rhomboid, trapezoid, X-shaped, Y-shaped, or kite-shaped pattern;
the three or more variable-speed motors can be turned on or off independently, turned on or off as a group, turned one or off in pairs, or each of the three or more variable-speed motors can operate independently to direct thrust in a same or a different direction;
the three or more variable-speed motors are rotatable about a longitudinal axis of the tail boom; or
each of the three or more variable-speed motors is on a pivot that allows for rotation of the first variable-speed motor.

20. The aircraft of claim 11, further comprising:
one or more fixed pitch blades attached to each of the three or more variable-speed motors; and.

wherein:
the one or more of the one or more fixed pitch blades are a different size;
a torque of each of the three or more variable-speed motors and the respective fixed pitch blade is based on a size, power and position of the variable-speed motor and the respective fixed pitch blade;
the three or more variable-speed motors and the respective fixed pitch blades are individually ducted; or
a ring or cowling surrounds one or more of the three or more variable-speed motors and the respective fixed pitch blades.

\* \* \* \* \*